(12) United States Patent
Olesen et al.

(10) Patent No.: US 9,991,992 B2
(45) Date of Patent: Jun. 5, 2018

(54) METHOD AND APPARATUS FOR IMPLEMENTING SPACE TIME PROCESSING

(71) Applicant: InterDigital Technology Corporation, Wilmington, DE (US)

(72) Inventors: Robert L. Olesen, Huntington, NY (US); Eldad M. Zeira, Huntington, NY (US); Peter J. Voltz, Commack, NY (US); Yongwen E. Yang, Columbia, MD (US); Qingyuan Dai, Germantown, MD (US); Chang-Soo Koo, Melville, NY (US); I-Tai Lu, Dix Hills, NY (US); KunJu Tsai, Chunan (TW)

(73) Assignee: InterDigital Technology Corporation, Wilmington, DE (US)

( * ) Notice: Subject to any disclaimer, the term of this patent is extended or adjusted under 35 U.S.C. 154(b) by 0 days. days.

(21) Appl. No.: 15/434,283

(22) Filed: Feb. 16, 2017

(65) Prior Publication Data

US 2017/0163383 A1    Jun. 8, 2017

Related U.S. Application Data

(63) Continuation of application No. 14/599,651, filed on Jan. 19, 2015, now Pat. No. 9,621,251, which is a
(Continued)

(51) Int. Cl.
*H04W 4/00* (2018.01)
*H04L 1/06* (2006.01)
(Continued)

(52) U.S. Cl.
CPC ......... *H04L 1/0643* (2013.01); *H04B 7/0456* (2013.01); *H04B 7/0626* (2013.01);
(Continued)

(58) Field of Classification Search
CPC ... H04L 1/0643; H04L 1/0606; H04L 1/0003; H04B 17/336; H04B 7/0456; H04B 7/0626; H04B 7/0697; H04W 84/12
See application file for complete search history.

(56) References Cited

U.S. PATENT DOCUMENTS 6,760,882 B1  7/2004  Gesbert et al.
6,785,341 B2  8/2004  Walton et al.
(Continued)

FOREIGN PATENT DOCUMENTS

CN    1701554 A    11/2005
EP    1 255 369    11/2002
(Continued)

OTHER PUBLICATIONS

Kawauchi et al., The Transmission Performance of Multi-Code OS-COMA with Frequency-Domain Equalizing Using Space-Time Cyclic Delay Transmit Diversity, IEICE Technical Report, RCS Radio Communication System, vol. 105, No. 356, pp. 43-48 (Oct. 13, 2005).
(Continued)

*Primary Examiner* — Abdelnabi O Musa
(74) *Attorney, Agent, or Firm* — Condo Roccia Koptiw LLP

(57) ABSTRACT

A method and apparatus for implementing spatial processing with unequal modulation and coding schemes (MCSs) or stream-dependent MCSs are disclosed. Input data may be parsed into a plurality of data streams, and spatial processing is performed on the data streams to generate a plurality of spatial streams. An MCS for each data stream is selected independently. The spatial streams are transmitted via multiple transmit antennas. At least one of the techniques of space time block coding (STBC), space frequency block coding (SFBC), quasi-orthogonal Alamouti coding, time reversed space time block coding, linear spatial processing
(Continued)

and cyclic delay diversity (CDD) may be performed on the data/spatial streams. An antenna mapping matrix may then be applied to the spatial streams. The spatial streams are transmitted via multiple transmit antennas. The MCS for each data stream may be determined based on a signal-to-noise ratio of each spatial stream associated with the data stream.

12 Claims, 4 Drawing Sheets

Related U.S. Application Data continuation of application No. 13/651,901, filed on Oct. 15, 2012, now Pat. No. 8,971,442, which is a continuation of application No. 11/621,755, filed on Jan. 10, 2007, now Pat. No. 8,295,401.

(60) Provisional application No. 60/758,034, filed on Jan. 11, 2006.

(51) Int. Cl.
*H04B 7/06* (2006.01)
*H04B 7/0456* (2017.01)
*H04B 17/336* (2015.01)
*H04L 1/00* (2006.01)
*H04W 84/12* (2009.01)

(52) U.S. Cl.
CPC ......... *H04B 7/0697* (2013.01); *H04B 17/336* (2015.01); *H04L 1/0606* (2013.01); *H04L 1/0003* (2013.01); *H04W 84/12* (2013.01)

(56) References Cited

U.S. PATENT DOCUMENTS

| | | | |
|---|---|---|---|
| 6,898,248 B1 * | 5/2005 | Elgamal | H04L 1/0048 375/259 |
| 7,002,900 B2 | 2/2006 | Walton et al. | |
| 7,406,055 B2 | 7/2008 | Taira et al. | |
| 7,430,244 B2 | 9/2008 | Chung et al. | |
| 7,646,822 B2 | 1/2010 | Kobayashi et al. | |
| 8,000,405 B2 | 8/2011 | Murakami et al. | |
| 8,320,301 B2 | 11/2012 | Walton et al. | |
| 2002/0118771 A1 | 8/2002 | Larsson | |
| 2002/0147953 A1 | 10/2002 | Catreux et al. | |
| 2003/0002450 A1 | 1/2003 | Jalali et al. | |
| 2004/0042439 A1 | 3/2004 | Menon et al. | |
| 2004/0057530 A1 | 3/2004 | Tarokh et al. | |
| 2004/0063437 A1 | 4/2004 | Braun et al. | |
| 2004/0082356 A1 | 4/2004 | Walton et al. | |
| 2004/0121730 A1 | 6/2004 | Kadous et al. | |
| 2004/0184398 A1 * | 9/2004 | Walton | H04L 1/0003 370/203 |
| 2004/0196919 A1 | 10/2004 | Mehta et al. | |
| 2004/0202257 A1 | 10/2004 | Mehta et al. | |
| 2004/0204104 A1 | 10/2004 | Horng et al. | |
| 2005/0002325 A1 * | 1/2005 | Giannakis | H04L 27/2608 370/208 |
| 2005/0002468 A1 | 1/2005 | Walton et al. | |
| 2005/0020215 A1 | 1/2005 | Hottinen | |
| 2005/0031062 A1 | 2/2005 | Shim et al. | |
| 2005/0068918 A1 | 3/2005 | Mantravadi et al. | |
| 2005/0128966 A1 | 6/2005 | Yee | |
| 2005/0157805 A1 | 7/2005 | Walton et al. | |
| 2005/0157807 A1 | 7/2005 | Shim et al. | |
| 2005/0163243 A1 | 7/2005 | Chung et al. | |
| 2005/0265477 A1 | 12/2005 | Takeda et al. | |
| 2005/0281240 A1 | 12/2005 | Oh | |
| 2005/0281349 A1 | 12/2005 | Kim | |
| 2006/0093062 A1 | 5/2006 | Yun et al. | |
| 2006/0109926 A1 | 5/2006 | Jalali et al. | |
| 2006/0120268 A1 | 6/2006 | Bar-Ness et al. | |
| 2006/0274847 A1 | 12/2006 | Molisch et al. | |
| 2007/0086529 A1 | 4/2007 | Krishnasawamy et al. | |
| 2007/0127603 A1 | 6/2007 | Niu et al. | |
| 2007/0140371 A1 | 6/2007 | Horng et al. | |
| 2007/0147543 A1 | 6/2007 | Horng et al. | |
| 2007/0270173 A1 * | 11/2007 | Niu | H04B 7/0413 455/522 |
| 2009/0252248 A1 | 10/2009 | Ghosh et al. | |
| 2010/0111220 A1 * | 5/2010 | Rouquette-Leveil | H04L 1/0618 375/295 |
| 2014/0369287 A1 | 12/2014 | Kim et al. | |

FOREIGN PATENT DOCUMENTS

| | | |
|---|---|---|
| EP | 1511189 | 3/2005 |
| EP | 1515471 | 3/2005 |
| EP | 1548971 A2 | 6/2005 |
| EP | 2378690 A1 | 10/2011 |
| JP | 2004-112471 A | 4/2004 |
| JP | 2005-057779 A | 3/2005 |
| JP | 2005-110228 A | 4/2005 |
| JP | 2005-160030 A | 6/2005 |
| JP | 2005-521358 A | 7/2005 |
| JP | 2005-535221 A | 11/2005 |
| JP | 2005-341317 A | 12/2005 |
| JP | 2005-537751 A | 12/2005 |
| KR | 10-2005-0065065 | 6/2005 |
| KR | 2012-0043169 A | 5/2012 |
| KR | 2014-0113925 A | 9/2014 |
| RU | 2003-135853 A | 4/2005 |
| RU | 2005-115854 A | 10/2005 |
| WO | WO 2003/075479 | 9/2003 |
| WO | WO 2004/038986 A2 | 5/2004 |
| WO | WO 2004/039011 | 5/2004 |
| WO | WO 2004/095730 A1 | 11/2004 |
| WO | WO 2005/055465 | 6/2005 |
| WO | WO 2005/060144 | 6/2005 |
| WO | WO 2005/060192 | 6/2005 |
| WO | WO 2005/069505 | 7/2005 |
| WO | WO 2005/078957 A1 | 8/2005 |
| WO | WO 2005/096519 A1 | 10/2005 |
| WO | WO 2005/104398 A1 | 11/2005 |
| WO | WO 2005/122426 | 12/2005 |
| WO | WO 2005/122516 | 12/2005 |
| WO | WO 2005/125140 | 12/2005 |
| WO | WO 2006/022526 A1 | 3/2006 |
| WO | WO 2006/029050 A2 | 3/2006 |
| WO | WO 2006/120865 A1 | 11/2006 |
| WO | WO 2010/124244 A2 | 10/2010 |

OTHER PUBLICATIONS

Dammann et al.. "Comparison of Space-Time Block Coding and Cyclic Delay Diversity for a Broadband Mobile Radio Air Interface," WPMC 2003, vol. 2, pp. 411-415 (2003).

Hashim et al., "Performance Comparison of Differential Multiple Transmit Diversity Schemes for OFDM Systems," CCSP 2005, pp. 256-261 (Nov. 16, 2005).

Alamouti, "A Simple Transmit Diversity Technique for Wireless Communications," IEEE Journal of Selective Areas of Communication, vol. 16, pp. 1451-1458 (Oct. 1998).

Assaf Kasher, *Proposed HT PHY Specification*, V1.27 JP, (Dec. 23, 2005).

Auer, "Channel Estimation for OFDM with Cyclic Delay Diversity," Personal, Indoor, and Mobile Radio Communications, vol. 3, pp. 1792-1796 (Sep. 2004).

Bjerke et al., "Packet Error Probability Prediction for System Level Simulations of MIMO-OFDM Based 802.11n WLANs", 2005 IEEE International Conference on Communications, 2005. ICC 2005, vol. 4, pp. 2538-2542, (May 16-20, 2005).

Draft Amendment to Standard [for] Information Technology—Telecommunications and information exchange between systems—Local and metropolitan area networks—Specific requirements—Part 11: Wireless LAN Medium Access Control (MAC) and

(56) References Cited

OTHER PUBLICATIONS

Physical Layer (PHY) specifications: Enhancements for Higher Throughput, IEEE P802.11n D0.01 (Jan. 2006).
Draft Amendment to Standard for Information Technology—Telecommunications and information exchange between systems—Local and metropolitan area networks—Specific requirements—Part 11: Wireless LAN Medium Access Control (MAC) and Physical Layer (PHY) specifications: Amendment <number>: Enhancements for Higher Throughput, IEEE P802.11n D1.04 (Sep. 2006).
Interdigital Communications Corporation, "Uplink MIMO SC-FDMA Scheme for EUTRA," 3GPP TSG RAN WG1 #43, R1-051368 (Nov. 7-11, 2005).
Kagami et al., "Technologies for Next-Generation Wireless LANs", NTT Technical Review, vol. 3, No. 1, pp. 31-36, (Jan. 2005).
Ketchum et al., "System Description and Operating Principles for High Throughput Enhancements to 802.11", IEEE P802.11 Wireless LANs, IEEE 802.11-04/0870r0, (Aug. 2004).
Sakaguchi et al., "Initial Measurement of MIMO eigenmode communication system," The Institute of Electronics, Information and Communication Engineers Transactions, pp. 1454-1466 (Sep. 9, 2004).
Ronald Raulefs et al., "Combining Transmit Diversity Schemes for Multicarrier Systems", VTC-2005-Fall. 2005 IEEE $62^{nd}$, vol. 1.
Bauch et al., "Orthogonal Frequency Division Multiple Access with Cyclic Delay Diversity", ITG Workshop on Smart Antennas, Mar. 18-19, 2004, pp. 17-24.
Lodhi et al., "Cyclic Delay Diversity Based Space-Time/Space-Frequency Coded MC-CDMA System", IEEE Vehicular Technology Magazine, vol. 1, No. 3, Sep. 2006, pp. 22-29.
IEEE P802.11 Wireless LANS, "Joint Proposal: High throughput extension to the 802.11 Standard: PHY", IEEE 802.11-05/1102r2, Jan. 10, 2006, 32 pages.

\* cited by examiner

METHOD AND APPARATUS FOR IMPLEMENTING SPACE TIME PROCESSING

CROSS REFERENCE TO RELATED APPLICATION

This application is a continuation of U.S. patent application Ser. No. 14/599,651 filed Jan. 19, 2015, which issued as U.S. Pat. No. 9,621,251 on Apr. 11, 2017, which is a continuation of U.S. patent application Ser. No. 13/651,901 filed Oct. 15, 2012, which issued as U.S. Pat. No. 8,971,442 on Mar. 3, 2015, which is a continuation of U.S. patent application Ser. No. 11/621,755 filed Jan. 10, 2007, which issued as U.S. Pat. No. 8,295,401 on Oct. 23, 2012, which claims benefit of U.S. Provisional Application No. 60/758,034 filed Jan. 11, 2006, which is incorporated by reference as if fully set forth.

FIELD OF INVENTION

The present invention is related to wireless communication systems. More particularly, the present invention is related to a method and apparatus for implementing spatial processing with unequal modulation and coding schemes (MCSs).

BACKGROUND

The IEEE 802.11n joint proposal group currently proposes using a hybrid space-time block cede (STBC) and spatial division multiplexing (SDM) scheme for the next generation of high performance wireless networks. This hybrid STBC/SDM scheme results in unbalanced quality of service for data streams which translates into lower residual signal-to-noise ratio (SNR) at the output of a receiver. In conventional systems, equal MCSs are applied to all spatial streams. However, this results in a loss of benefits of the diversity gain for the spatial stream carried by STBC precoding.

Therefore, it would be desirable to provide a method and apparatus for applying unequal MCSs or stream dependent MCSs while performing spatial processing, such as STBC.

SUMMARY

The present invention is related to a method and apparatus for implementing spatial processing with unequal MCSs or stream-dependent MCSs. Input data may be parsed into a plurality of data streams, and spatial processing is performed on the data streams to generate a plurality of spatial streams. An MCS for each data stream is selected independently. The spatial streams are then transmitted via multiple transmit antennas. At least one of the techniques of STBC, space frequency block coding (SFBC), quasi-orthogonal Alamouti coding, time reversed space time block coding, linear spatial processing and cyclic delay diversity (CDD) may be performed on the data/spatial streams. An antenna mapping matrix may then be applied to the spatial streams. The resulted spatial streams are then transmitted via multiple transmit antennas. The MCS for each data stream may be determined based on an SNR of each spatial stream associated with the data stream.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

In accordance with the present invention, unequal MCSs or stream-dependent MCSs are applied to different spatial streams. The present invention may be applied in an orthogonal frequency division multiplexing (OFDM)-multiple-input multiple-output (MIMO) system, a multi-carrier code division multiple access (MC-CDMA) system, a CDMA system, or the like. Unequal MCSs are applied in different data streams to take advantage of unequal SNRs for different data streams. For example, a higher order MCS may be applied to a spatial stream which has diversity coding and a lower order MCS to a spatial stream that does not have diversity coding to reduce the total self induced interference. With unequal MCSs, or stream-dependent MCSs, a simpler receiver algorithm, (e.g., linear minimum mean square error (LMMSE)), may be used due to the reduced self interference.

Figure 1:
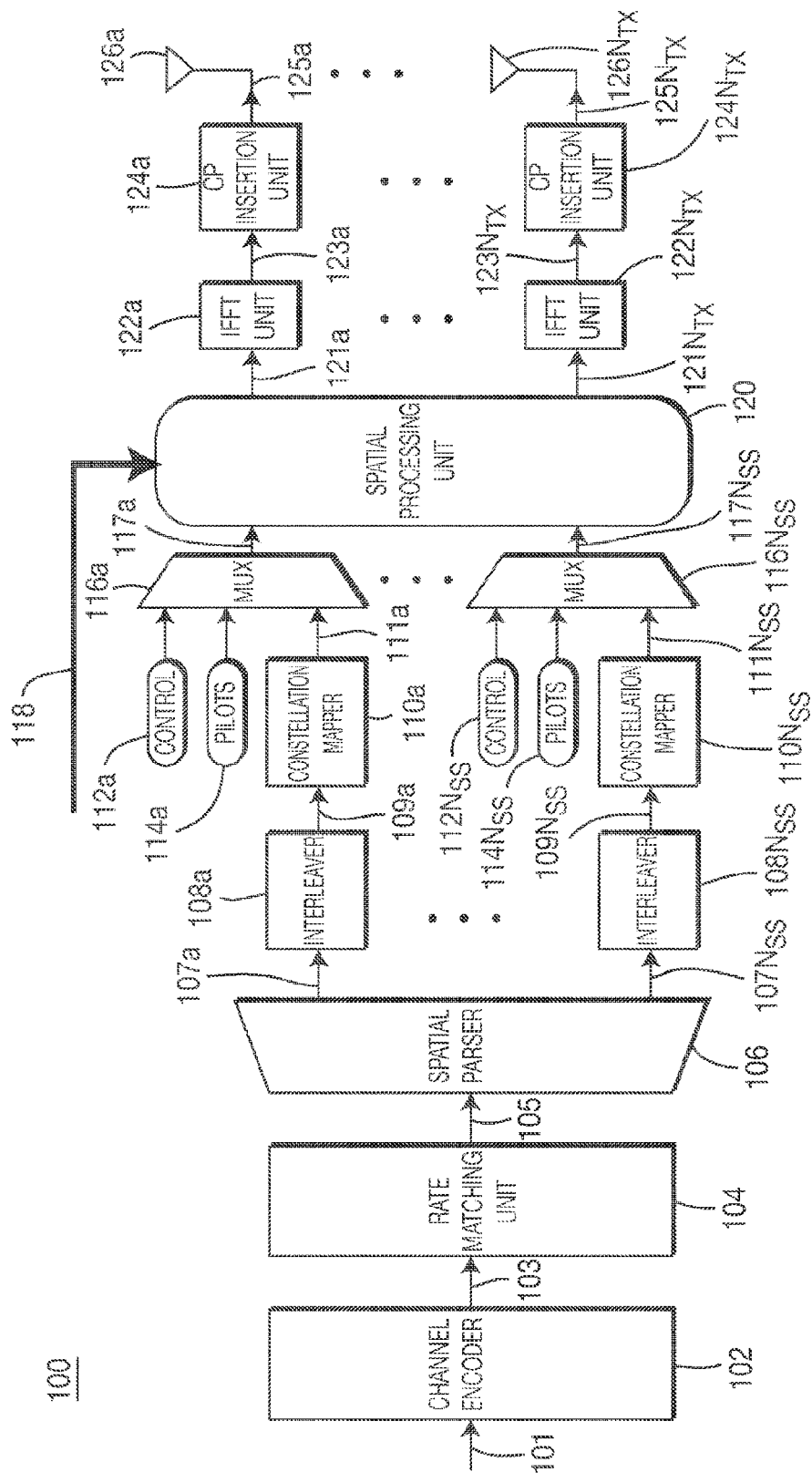
FIG. 1 is a block diagram of a transmitter configured in accordance with the present invention.

FIG. 1 is a block diagram of a transmitter 100 configured in accordance with the present invention. The transmitter 100 includes a channel encoder 102, a rate matching unit 104, a spatial parser 106, a plurality of interleavers $108a$-$108n_{ss}$, a plurality of constellation mappers $110a$-$110n_{ss}$, a plurality of multiplexers $116a$-$116n_{ss}$, a spatial processing unit 120, a plurality of inverse fast Fourier transform (IFFT) units $122a$-$122n_{tx}$, a plurality of cyclic prefix (CP) insertion units $124a$-$124n_{tx}$ and a plurality of transmit antennas $126a$-$126n_{tx}$. It, should be noted that the configuration shown in FIG. 1 is provided as an example, not as a limitation, and the processing performed by the components may be implemented by more or less components and the order of processing may be changed.

The channel encoder 102 encodes input data 101. Adaptive modulation and coding (AMC) is used and any coding rate and any coding scheme may be used. For example, the coding rate may be ½, ⅓, ⅕, ¾, or the like. The coding scheme may be Turbo coding, convolutional coding, block coding, low density parity check (LDPC) coding, or the like. The encoded data 103 may be punctured by the rate matching unit 104.

The encoded data after rate matching 105 is parsed into a plurality of ($N_{SS}$) spatial streams $107a$-$107n_{ss}$ by the spatial parser 106. Data bits on each data stream $107a$-$107n_{ss}$ are preferably interleaved by the interleaves $108a$-$108n_{ss}$. The data bits after interleaving $109a$-$109n_{ss}$ are then mapped to symbols $111a$-$111n_{ss}$ by the constellation mappers $110a$-$110n_{ss}$ in accordance with a selected modulation scheme. The modulation scheme may be Quadrature phase shift keying (QPSK), 8PSK, 16 Quadrature amplitude modulation (QAM), 64 QAM, or the like. Control data $112a$-$112n_{ss}$ and/or pilots $114a$-$114n_{ss}$ are multiplexed with symbols $111a$-$111n_{ss}$ by the multiplexer $116a$-$116n_{ss}$. The symbols 117a-117$n_{ss}$ (including the multiplexed control data 112a-112$n_{ss}$ and/or pilots 114a-114$n_{ss}$ are processed by the spatial processing unit 120.

Alternatively, the input data 101 may be split prior to channel encoding and the split multiple input data may be encoded by two or more separate encoders. Alternatively, instead of, or in addition to, parsing one data stream into multiple data streams, several input data streams that, may belong to one or more users may be processed to be transmitted via several spatial streams.

The spatial processing unit 120 selectively performs spatial processing on the symbols 117a-117$n_{ss}$ based on channel state information 118 and outputs $N_{TX}$ data streams 121a-121$n_{tx}$. The spatial processing may be space time coding (STC), spatial multiplexing (SM), linear spatial mapping, or transmit beamforming. For STC, any form of STC may be used including STBC, SFBC, quasi-orthogonal Alamouti for four (4) transmit antennas, time reversed STBC (TR-STBC), CDD, or the like.

The channel state information 118 may be at least one of a V matrix for every sub-carrier, an SNR, a channel matrix rank, a channel condition number, delay spread, or short and/or long term channel statistics. The V matrix is an unitary matrix obtained from the singular value decomposition (SVD) of the estimated channel matrix. The channel condition number is related to the rank of the channel matrix. An ill-conditioned channel may be rank deficient. A low rank, or ill-conditioned channel would exhibit better robustness using a diversity scheme such STBC since the channel would not have sufficient degree of freedom to support SM with transmit beamforming. A high rank channel would support higher data rates using SM with transmit beamforming. The channel state information 118 may be obtained using conventional techniques, such as direct channel feedback (DCFB).

The data streams 121a-121$n_{tx}$ from the spatial processing unit 120 are processed by the IFFT units 122a-122$n_{tx}$ which output time domain data 123a-123$n_{tx}$. A CP is added to each of the time domain data 123a-123$n_{tx}$ by the CP insertion unit 124a-124$n_{tx}$. The time domain data with CP 125a-125$n_{tx}$ is then transmitted via the transmit antennas 126a-126$n_{tx}$.

Figure 2:
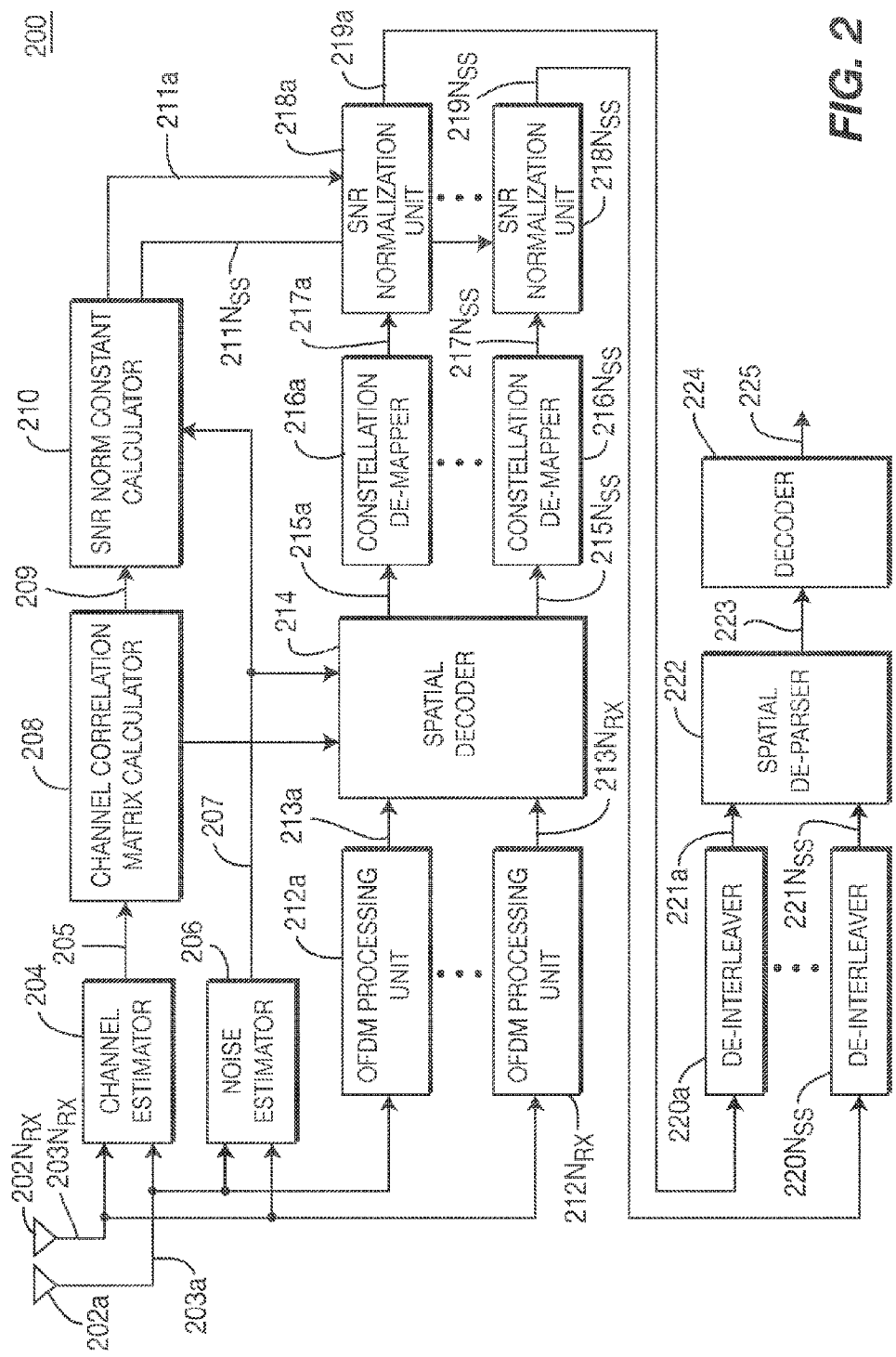
FIG. 2 a block diagram of a receiver configured in accordance with the present invention.

FIG. 2 is a block diagram of a receiver 200 configured in accordance with the present invention. The receiver 200 comprises a plurality of receive antennas 202a-202$n_{rx}$, a channel estimator 204, a noise estimator 206, a channel correlation matrix calculator 208, an SNR norm constant calculator 210, a plurality of OFDM processing units 212a-212$n_{rx}$, a spatial decoder 214, a plurality of constellation de-mappers 126a-126$n_{ss}$, a plurality of SNR normalization units 128a-128$n_{ss}$, a plurality of de-interleavers 220a-220$n_{ss}$, a spatial de-parser 222 and a decoder 224. It should be noted that the configuration shown in FIG. 2 is provided as an example, not as a limitation, and the processing performed by the components may be implemented by more or less components and the order of processing may be changed.

A plurality of received data streams 203a-203$n_{rx}$ are input into the channel estimator 204, the noise estimator 206 and the OFDM processing units 212a-212$n_{rx}$. The channel estimator 204 performs channel estimate to generate a channel matrix 205 using a conventional method. The noise estimator 206 calculates a noise variance 207. The channel correlation matrix calculator 208 generates a correlation matrix 209 from the channel matrix 205, which will be explained in detail hereinafter. The SNR norm constant calculator 210 calculates SNR norm constants 211a-211$n_{ss}$ from the correlation matrix 209 and the noise variance 207, which will be explained, in detail hereinafter.

Each of the OFDM processing unit 212a-212$n_{rx}$ removes a CP from each received data stream 203a-203$n_{rx}$ and performs a fast Fourier transform (FFT) to output frequency domain data 212a-212$n_{rx}$. The outputs 212a-212$n_{rx}$ from the OFDM processing units 212a-212$n_{rx}$ are processed by the spatial decoder 214. The spatial decoder 214 may be a minimum mean square error (MMSE) decoder, an MMSE-successive interference cancellation (SIC) decoder or a maximum likelihood (ML) decoder.

After spatial decoding, the decoded data 215a-212$n_{ss}$ is processed by the constellation de-mappers 216a-216$n_{ss}$ to generate bit streams 217a-217$n_{ss}$. The bit streams 217a-217$n_{ss}$ are normalized by the SNR normalization units 218a-218$n_{ss}$ based on the SNR norm constants 211a-211$n_{ss}$. The normalized bits streams 219a-219$n_{ss}$ are then processed by the de-interleavers 220a-220$n_{ss}$. The de-interleaved bits 221a-221$n_{ss}$ are merged into one bit stream 223 by the spatial de-parser 222. The bit stream 223 is then processed by the decoder 224 to recover the input data 225.

Hereinafter, spatial processing at the transmitter 100 and the receiver 200 will be explained with reference to STBC as a representative example. The following definitions will be used:

$N_{TX}$: the number of transmit antennas;
$N_{SS}$: the number of spatial streams;
$N_{STS}$: the number of streams after STBC;
$d_{k,n}$: a data vector at symbol time n;
$s_{k,n}$: a vector after STBC at symbol time n;
$x_{k,n}$: a vector after P matrix, in FIG. 3 at symbol time n; and
$y_{k,n}$: a received vector at symbol time n.

Figure 3:
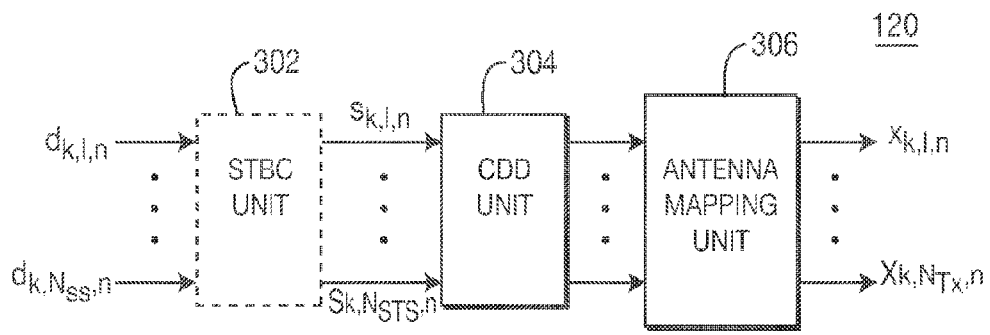
FIG. 3 is a block diagram of an exemplary spatial processing unit configured to perform STBC and/or linear spatial mapping.

FIG. 3 is a block diagram of an exemplary spatial processing unit 120 configured to perform STBC and/or linear spatial mapping. The spatial processing unit 120 may include an STBC unit 302, a CDD unit 304 and an antenna mapping unit 306. Each of the symbols 117a-117$n_{ss}$ is a stream of complex numbers. A complex symbol transmitted on a spatial stream i of a subcarrier k of an OFDM symbol n is denoted by $d_{k,i,n}$. The STBC unit 302 processes two sequential OFDM symbols in each subcarrier. The output symbols from the STBC unit 302 on an output space-time stream $i_{STS}$ on a subcarrier k on OFDM symbols 2m and 2m+1 are given by:

$$s_{k,i_{XTS},2m} = f_{0,i_{STS}}(d_{k,i_{XS},2m}, d_{k,i_{SS},2m+1})$$

$$s_{k,i_{STS},2m+1} = f_{1,i_{STS}}(D_{k,i_{XS},2m}, d_{k,i_{SS},2m+1}),\quad \text{Equation (1)}$$

where $f_{0,i_{STS}}$ and $f_{1,i_{STS}}$ are defined in Table 1.

TABLE 1

| $N_{STS}$ | $N_{SS}$ | $i_{STS}$ | $f_{0, i_{STS}}$ | $f_{1, i_{STS}}$ |
|---|---|---|---|---|
| 2 | 1 | 1 | $d_{k, 1, 2m}$ | $d_{k, 1, 2m+1}$ |
|   |   | 2 | $-d_{k, 1, 2m+1}^*$ | $d_{k, 1, 2m}^*$ |
| 3 | 2 | 1 | $d_{k, 1, 2m}$ | $d_{k, 1, 2m+1}$ |
|   |   | 2 | $-d_{k, 1, 2m+1}^*$ | $d_{k, 1, 2m}^*$ |
|   |   | 3 | $d_{k, 2, 2m}$ | $d_{k, 2, 2m+1}$ |
| 4 | 2 | 1 | $d_{k, 1, 2m}$ | $d_{k, 1, 2m+1}$ |
|   |   | 2 | $-d_{k, 1, 2 m+1}^*$ | $d_{k, 1, 2m}^*$ |
|   |   | 3 | $d_{k, 2, 2m}$ | $d_{k, 2, 2m+1}$ |
|   |   | 4 | $-d_{k, 2, 2m+1}^*$ | $d_{k, 2, 2m}^*$ |
|   | 3 | 1 | $d_{k, 1, 2m}$ | $d_{k, 1, 2m+1}$ |
|   |   | 2 | $-d_{k, 1, 2, m+1}^*$ | $d_{k, 1, 2m}^*$ |
|   |   | 3 | $d_{k, 2, 2m}$ | $d_{k, 2, 2m+1}$ |
|   |   | 4 | $d_{k, 3, 2m}$ | $d_{k, 3, 2m+1}$ |

Linear spatial processing may be performed by the CDD unit 304 and the antenna mapping unit 306 on the output symbols from the STBC unit 302. If STBC is not performed, $s_{k,i,n} = d_{k,i,n}$ and $N_{STS} = N_{SS}$. Linear spatial processing is defined as a sequence of rotations of the vector of symbols that is to be transmitted M a given subcarrier. The processing by the CDD unit 304 and the antenna mapping unit 306 are expressed as follows:

$$x_{k,n} = [P_{map}(k)]_{N_{STS}} C_{CDD}(k)) s_{k,n}, \quad \text{Equation (2)}$$

where $s_{k,n} = [s_{k,i,n} \ldots s_{k,N_{STS},N}]^T$ is an $N_{STS}$-vector of modulation symbols to be transmitted on a subcarrier k of an OFDM symbol n. $C_{CDD}(k)$ is an $N_{SS} \times N_{SS}$ diagonal cyclic delay matrix which represents the cyclic delay in the frequency domain. The diagonal values are given by $[C_{CDD}(k)]_{i,i} = \exp(-j2\pi k \Delta_F T_{CS}{}^i)$. $[P_{map}(k)]_{N_{STS}}$ is an $N_{TX} \times N_{STS}$ matrix comprising the first $N_{STS}$ columns of the $N_{TX} \times N_{TX}$ unitary antenna mapping matrix $P_{map}(k)$. This may be an identity matrix for direct-mapped operation, a mapping matrix for spatial spreading operation, or a channel-specific steering matrix such as a set of channel eigenvectors, $x_{k,n}$ is an $N_{TX}$-vector of transmitted symbols in a subcarrier k of an OFDM symbol n.

A channel matrix $H_{eff}$ is an effective channel seen y the vector $s_{k,n}$ so that:

$$y_{k,n} = H_{eff} s_{k,n} + n_{k,n}. \quad \text{Equation (3)}$$

In the receiver, $y_{k,2m}$ and $y^*_{k,2m+1}$ are combined into a single vector as follows:

$$y_k = \begin{bmatrix} y_{k,2m} \\ y^*_{k,2m+1} \end{bmatrix}. \quad \text{Equation (4)}$$

Using Equations (3) and (4), $$y_k = \begin{bmatrix} H_{eff} s_{k,2m} \\ H^*_{eff} s^*_{k,2m+1} \end{bmatrix} + \begin{bmatrix} n_{k,2m} \\ n^*_{k,2m+1} \end{bmatrix}. \quad \text{Equation (5)}$$

In the vectors $s_{k,2m}$ and $s^*_{k,2m+1}$, any data value that appears in either of them will appear either conjugated in both or unconjugated in both. This allows writing Equation (5) as a simple matrix form, as illustrated by the following specific example.

Consider the case of $N_{tx}=3$ and $N_{ss}=2$, (i.e., two (2) spatial streams are generated from input data by the spatial parser 106 and three data streams are generated from the spatial processing unit 120 at the transmitter 100). One of the three data streams is created from the modified replica of one data stream of the spatial parser 106 for transmit diversity as shown below.

From Table 1, for the case of $N_{tx}=3$ and $N_{ss}2$, the following can be seen:

$$s_{k,1,2m} = d_{k,1,2m};$$

$$s_{k,2,2m} = -d^*_{k,1,2m+1}; \text{ and}$$

$$s_{k,3,2m} = d_{k,2,2m}.$$

so that $$s_{k,2m} = \begin{bmatrix} d_{k,1,2m} \\ -d^*_{k,1,2m+1} \\ d_{k,2,2m} \end{bmatrix}. \quad \text{Equation (6)}$$

Also, $$s_{k,1,2m+1} = d_{k,1,2m+1};$$

$$s_{k,2,2m+1} = d^*_{k,1,2m}; \text{ and}$$

$$s_{k,3,2m+1} = d_{k,2,2m+1}.$$

so that $$s_{k,2m+1} = \begin{bmatrix} d_{k,1,2m+1} \\ d^*_{k,1,2m} \\ d_{k,2,2m+1} \end{bmatrix}; \quad \text{Equation (7)}$$

and $$s^*_{k,2m+1} = \begin{bmatrix} d^*_{k,1,2m+1} \\ d_{k,1,2m} \\ d^*_{k,2,2m+1} \end{bmatrix}. \quad \text{Equation (8)}$$

Using Equations (6) and (8), Equation (5) can be rewritten as a standard matrix equation involving the four data values $d_{k,1,2m}, d^*_{k,1,2m+1}, d_{k,2,2m}, d^*_{k,2,2m+1}$ as follows (the asterisks mean conjugation, not Hermitian conjugation).

$$y_k = \begin{bmatrix} H_{eff}(:,1) & -H_{eff}(:,2) & H_{eff}(:,3) & 0 \\ H^*_{eff}(:,2) & H^*_{eff}(:,1) & 0 & H^*_{eff}(:,3) \end{bmatrix} \begin{bmatrix} d_{k,1,2m} \\ d^*_{k,1,2m+1} \\ d_{k,2,2m} \\ d^*_{k,2,2m+1} \end{bmatrix} + \begin{bmatrix} n_{k,2m} \\ n^*_{k,2m+1} \end{bmatrix}. \quad \text{Equation (9)}$$

This is now in a standard MIMO form, but with a channel matrix which is a composite of the various columns of $H_{eff}$. The receiver 200 demodulates the data vector d:

$$d = \begin{bmatrix} d_{k,1,2m} \\ d^*_{k,1,2m+1} \\ d_{k,2,2m} \\ d^*_{k,2,2m+1} \end{bmatrix}. \quad \text{Equation (10)}$$

An MMSE demodulator may be used for the data vector in Equation (10). Let the channel matrix in Equation (9) be denoted as follows:

$$\tilde{H} = \begin{bmatrix} H_{eff}(:,1) & -H_{eff}(:,2) & H_{eff}(:,3) & 0 \\ H^*_{eff}(:,2) & H^*_{eff}(:,1) & 0 & H^*_{eff}(:,3) \end{bmatrix}. \quad \text{Equation (11)}$$

An MMSE solution is as follows (dropping the index k and using the symbol '+' for Hermitian conjugate):

$$\hat{d} = \left( \frac{1}{\sigma_d^2} I + \frac{1}{\sigma_n^2} \tilde{H}^+ \tilde{H} \right)^{-1} \tilde{H}^+ \frac{1}{\sigma_n^2} y; \quad \text{Equation (12)}$$

or, equivalently, $$\hat{d} = \left( \frac{\sigma_n^2}{\sigma_d^2} I + \tilde{H}^+ \tilde{H} \right)^{-1} \tilde{H}^+ y. \quad \text{Equation (13)}$$

Equation (9) can be written as follows:

$$y = \tilde{H}d + n. \quad \text{Equation (14)}$$

Substituting Equation (14) into Equation (12) yields:

$$\hat{d} = \left(\frac{\sigma_n^2}{\sigma_d^2}I + \tilde{H}^+\tilde{H}\right)^{-1}\tilde{H}^+\tilde{H}d + \left(\frac{\sigma_n^2}{\sigma_d^2}I + \tilde{H}^+\tilde{H}\right)^{-1}\tilde{H}^+n. \quad \text{Equation (15)}$$

Using Equation (11), the correlation matrix $\tilde{H}^+ \tilde{H}$ becomes as follows:

$$\tilde{H}^+\tilde{H} = \begin{bmatrix} H_{\text{eff}}^+(:,1) & H_{\text{eff}}^T(:,2) \\ -H_{\text{eff}}^+(:,2) & H_{\text{eff}}^T(:,1) \\ H_{\text{eff}}^+(:,3) & 0 \\ 0 & H_{\text{eff}}^T(:,3) \end{bmatrix} \begin{bmatrix} H_{\text{eff}}(:,1) & -H_{\text{eff}}(:,2) & H_{\text{eff}}(:,3) & 0 \\ H_{\text{eff}}^*(:,2) & H_{\text{eff}}^*(:,1) & 0 & H_{\text{eff}}^*(:,3) \end{bmatrix} \quad \text{Equation (16)}$$

$$\tilde{H}^+\tilde{H} = \begin{bmatrix} \|H_{\text{eff}}(:,1)\|^2 + \|H_{\text{eff}}(:,2)\|^2 & 0 & H_{\text{eff}}^+(:,1)H_{\text{eff}}(:,3) & H_{\text{eff}}^+(:,3)H_{\text{eff}}(:,2) \\ 0 & \|H_{\text{eff}}(:,1)\|^2 + \|H_{\text{eff}}(:,2)\|^2 & -H_{\text{eff}}^+(:,2)H_{\text{eff}}(:,3) & H_{\text{eff}}^+(:,3)H_{\text{eff}}(:,1) \\ H_{\text{eff}}^+(:,3)H_{\text{eff}}(:,1) & -H_{\text{eff}}^+(:,3)H_{\text{eff}}(:,2) & \|H_{\text{eff}}(:,3)\|^2 & 0 \\ H_{\text{eff}}^+(:,2)H_{\text{eff}}(:,3) & H_{\text{eff}}^+(:,1)H_{\text{eff}}(:,3) & 0 & \|H_{\text{eff}}(:,3)\|^2 \end{bmatrix}$$

The effective SNR for the $k^{th}$ data stream in Equation (9), after MMSE receiver processing, is known to be:

$$SNR_k = \frac{1}{\left(I + \rho\tilde{H}^+\tilde{H}\right)^{-1}_{kk}} - 1; \text{ where } \rho = \frac{\sigma_d^2}{\sigma_n^2}. \quad \text{Equation (17)}$$

For high SNR, Equation (17) becomes:

$$SNR_k \approx \frac{\rho}{\left(\tilde{H}^+\tilde{H}\right)^{-1}_{kk}}. \quad \text{Equation (18)}$$

The matrix $\tilde{H}^+ \tilde{H}$ has the form:

$$\tilde{H}^+\tilde{H} = \begin{bmatrix} x & 0 & a & b \\ 0 & x & -b^* & a^* \\ a^* & -b & z & 0 \\ b^* & a & 0 & z \end{bmatrix}. \quad \text{Equation (19)}$$

The definitions of the parameters in Equation (19) are easily found from the expression for $\tilde{H}^+ \tilde{H}$. Using the general formula for the inverse of a matrix as follows:

$$A^{-1} = \frac{cof^T(A)}{\det(A)}; \quad \text{Equation (20)}$$

It can be shown that the diagonal elements $(\tilde{H}^+ \tilde{H})^{-1}$ are given by:

$$(\tilde{H}^+\tilde{H})^{-1}_{11} = \frac{z(xz - |b|^2 - |a|^2)}{\det(\tilde{H}^+\tilde{H})}; \quad \text{Equation (21)}$$

$$(\tilde{H}^+\tilde{H})^{-1}_{22} = \frac{z(xz - |b|^2 - |a|^2)}{\det(\tilde{H}^+\tilde{H})}; \quad \text{Equation (22)}$$

$$(\tilde{H}^+\tilde{H})^{-1}_{33} = \frac{x(xz - |b|^2 - |a|^2)}{\det(\tilde{H}^+\tilde{H})}; \text{ and} \quad \text{Equation (23)}$$

$$(\tilde{H}^+\tilde{H})^{-1}_{44} = \frac{x(xz - |b|^2 - |a|^2)}{\det(\tilde{H}^+\tilde{H})}. \quad \text{Equation (24)}$$

Using Equation (18), SNRs the each data streams are obtained as follows:

$$SNR_1 = \rho\frac{\det(\tilde{H}^+\tilde{H})}{z(xz - |b|^2 - |a|^2)}; \quad \text{Equation (25)}$$

$$SNR_2 = \rho\frac{\det(\tilde{H}^+\tilde{H})}{z(xz - |b|^2 - |a|^2)}; \quad \text{Equation (26)}$$

$$SNR_3 = \rho\frac{\det(\tilde{H}^+\tilde{H})}{x(xz - |b|^2 - |a|^2)}; \text{ and} \quad \text{Equation (27)}$$

$$SNR_4 = \rho\frac{\det(\tilde{H}^+\tilde{H})}{x(xz - |b|^2 - |a|^2)}. \quad \text{Equation (28)}$$

For any above channel realization, the first two components d (the ones which have the STBC code applied to them) have the same SNR, and the other two have also equal SNR. The second one is generally smaller than the first one. The ratio of the SNRs for the coded to the uncoded components of d is as follows;

$$\frac{SNR_{1,2}}{SNR_{3,4}} = \frac{x}{z} = \frac{\|H_{\text{eff}}(:,1)\|^2 + \|H_{\text{eff}}(:,2)\|^2}{\|H_{\text{eff}}(:,3)\|^2}. \quad \text{Equation (29)}$$

Assuming that the three columns of $H_{\text{eff}}$ have similar properties, the SNR will be about 3 dB higher on average for the TEC coded symbols.

In implementing STBC, a pair of subsequent symbols may be transmitted via a same frequency or different frequencies. For evaluation, the simplest case of $N_{tx}=2$ and $N_{ss}=1$ is considered herein supposing that there is only one receive antenna at the receiver. The effective channel matrix is represented as a 1×2 matrix as follows;

$$H_{eff}=[h_1 h_2], \quad \text{Equation (30)}$$

and the data vector becomes as follows:

$$d = \begin{bmatrix} d_{k,1,2m} \\ d^*_{k,1,2m+1} \end{bmatrix}. \quad \text{Equation (31)}$$

When the same frequency is used for the successive symbols, $H_{eff}$ is the same for both symbols and Equation (5) becomes as follows:

$$y_k = \begin{bmatrix} h_1 & -h_2 \\ h^*_2 & h^*_1 \end{bmatrix} \begin{bmatrix} d_{k,1,2m} \\ d^*_{k,1,2m+1} \end{bmatrix} + \begin{bmatrix} n_{k,2m} \\ n^*_{k,2m+1} \end{bmatrix}. \quad \text{Equation (32)}$$

If a zero forcing receiver is used, the first step is to multiply $y_k$ the Hermitian conjugate of the channel matrix:

$$\tilde{H} = \begin{bmatrix} h_1 & -h_2 \\ h^*_2 & h^*_1 \end{bmatrix}; \quad \text{Equation (33)}$$

to get $$\tilde{H}^+ y_k = \begin{bmatrix} h^*_1 & h_2 \\ -h^*_2 & h_1 \end{bmatrix} \begin{bmatrix} h_1 & -h_2 \\ h^*_2 & h^*_1 \end{bmatrix} \begin{bmatrix} d_{k,1,2m} \\ d^*_{k,1,2m+1} \end{bmatrix} + \begin{bmatrix} h^*_1 & h_2 \\ -h^*_2 & h_1 \end{bmatrix} \begin{bmatrix} n_{k,2m} \\ n^*_{k,2m+1} \end{bmatrix}$$

$$= \begin{bmatrix} |h_1|^2 + |h_2|^2 & 0 \\ 0 & |h_1|^2 + |h_2|^2 \end{bmatrix} \begin{bmatrix} d_{k,1,2m} \\ d^*_{k,1,2m+1} \end{bmatrix} + \begin{bmatrix} h^*_1 & h_2 \\ -h^*_2 & h_1 \end{bmatrix} \begin{bmatrix} n_{k,2m} \\ n^*_{k,2m+1} \end{bmatrix}.$$

The diagonal matrix elements $|h_1|^2+|h_2|^2$ in the signal part represent the diversity of order 2 that is gained by the STBC code.

When different frequencies are used fir the successive symbols, the effective channels for the two symbols are as follows:

$H_{eff}=[h_1 h_2]$ for the first symbol; and $H_{eff}=[g_1 g_2]$ for the second symbol.

In this case the modified Equation (5) be as follows:

$$y_k = \begin{bmatrix} h_1 & -h_2 \\ g^*_2 & g^*_1 \end{bmatrix} \begin{bmatrix} d_{k,1,2m} \\ d^*_{k,1,2m+1} \end{bmatrix} + \begin{bmatrix} n_{k,2m} \\ n^*_{k,2m+1} \end{bmatrix}; \quad \text{Equation (34)}$$

and the followings are obtained:

$$\tilde{H} = \begin{bmatrix} h_1 & -h_2 \\ h^*_2 & h^*_1 \end{bmatrix}; \quad \text{Equation (35)}$$

and $$\tilde{H}^+ y_k = \begin{bmatrix} h^*_1 & g_2 \\ -h^*_2 & g_1 \end{bmatrix} \begin{bmatrix} h_1 & -h_2 \\ g^*_2 & g^*_1 \end{bmatrix} \begin{bmatrix} d_{k,1,2m} \\ d^*_{k,1,2m+1} \end{bmatrix} + \quad \text{Equation (36)}$$

$$\begin{bmatrix} h^*_1 & g_2 \\ -h^*_2 & g_1 \end{bmatrix} \begin{bmatrix} n_{k,2m} \\ n^*_{k,2m+1} \end{bmatrix}$$

$$= \begin{bmatrix} |h_1|^2 + |g_2|^2 & -h^*_1 h_2 + g^*_1 g_2 \\ -h^*_2 h_1 + g^*_2 g_1 & |h_2|^2 + |g_2|^2 \end{bmatrix} \begin{bmatrix} d_{k,1,2m} \\ d^*_{k,1,2m+1} \end{bmatrix} +$$

$$\begin{bmatrix} h^*_1 & g_2 \\ -h^*_2 & g_1 \end{bmatrix} \begin{bmatrix} n_{k,2m} \\ n^*_{k,2m+1} \end{bmatrix}.$$

The diagonal matrix elements $|h_1|^2+|g_2|^2$ in the signal part represent the diversity of order 2 that is gained by the STBC code. In this case, the diagonal elements still represent diversity of order 2. However, the of diagonal elements contribute interference i.e., non-orthogonality).

For the 2×1 case of Table 1, Equation (5) becomes as follows:

$$y_k = \begin{bmatrix} h_1 & -h_2 \\ h^*_2 & h^*_1 \end{bmatrix} \begin{bmatrix} d_{k,1,2m} \\ d^*_{k,1,2m+1} \end{bmatrix} + \begin{bmatrix} n_{k,2m} \\ n^*_{k,2m+1} \end{bmatrix}; \quad \text{Equation (37)}$$

wherein $$\tilde{H} = \begin{bmatrix} h_1 & -h_2 \\ h^*_2 & h^*_1 \end{bmatrix}; \quad \text{Equation (38)}$$

and $$d = \begin{bmatrix} d_{k,1,2m} \\ d^*_{k,1,2m+1} \end{bmatrix}, \quad \text{Equation (39)}$$

The MMSE estimator of d in this case is as follows:

$$\hat{d}=\rho\tilde{H}^+(\rho\tilde{H}\tilde{H}^+ + I)^{-1} y_k, \quad \text{Equation (40)}$$

$$\tilde{H}\tilde{H}^+ = \begin{bmatrix} h_1 & -h_2 \\ h^*_2 & h^*_1 \end{bmatrix} \begin{bmatrix} h^*_1 & h_2 \\ -h^*_2 & h_1 \end{bmatrix} = \quad \text{Equation (41)}$$

$$\begin{bmatrix} |h_1|^2 + |h_2|^2 & 0 \\ 0 & |h_1|^2 + |h_2|^2 \end{bmatrix}.$$

Equation (40) becomes:

$$\hat{d} = \quad \text{Equation (42)}$$

$$\rho \begin{bmatrix} h^*_1 & h_2 \\ -h^*_2 & h_1 \end{bmatrix} \begin{bmatrix} \rho(|h_1|^2 + |h_2|^2) + 1 & 0 \\ 0 & \rho(|h_1|^2 + |h_2|^2) + 1 \end{bmatrix}^{-1} y_k;$$

or, $$\begin{bmatrix} \hat{d}_{2m} \\ \hat{d}^*_{2m+1} \end{bmatrix} = \frac{\rho}{\rho(|h_1|^2 + |h_2|^2) + 1} \begin{bmatrix} h^*_1 & h_2 \\ -h^*_2 & h_1 \end{bmatrix} \begin{bmatrix} y_{2m} \\ y^*_{2m+1} \end{bmatrix}. \quad \text{Equation (43)}$$

Alternatively, the MMSE estimates of $d_{2m}$ and $d_{2m+1}$ may be found using just $y_{2m}$ and then $y_{2m+1}$ and then adding them up. Applying this scheme for the first symbol:

$$y_{2m} = [h_1 \quad h_2] \begin{bmatrix} d_{2m} \\ -d^*_{2m+1} \end{bmatrix} + n_{2m}, \quad \text{Equation (44)}$$

and the MMSE estimate of the data vector from the first symbol is:

$$\begin{bmatrix} \hat{d}_{2m} \\ -\hat{d}^*_{2m+1} \end{bmatrix} = \rho \begin{bmatrix} h^*_1 \\ h^*_2 \end{bmatrix} \left( \rho [h_1 \quad h_2] \begin{bmatrix} h^*_1 \\ h^*_2 \end{bmatrix} + 1 \right)^{-1} y_{2m}, \quad \text{Equation (45)}$$

or, $$\begin{bmatrix} \hat{d}_{2m} \\ -\hat{d}^*_{2m+1} \end{bmatrix} = \frac{\rho}{\rho(|h_1|^2 + |h_2|^2) + 1} \begin{bmatrix} h^*_1 \\ h^*_2 \end{bmatrix} y_{2m}. \quad \text{Equation (46)}$$

Applying this scheme for the second symbol:

$$y_{2m+1} = [\,h_1 \quad h_2\,]\begin{bmatrix} d_{2m+1} \\ d_{2m}^* \end{bmatrix} + n_{2m+1}, \quad \text{Equation (47)}$$

and the MMSE estimate a the data vector from the second symbol is:

$$\begin{bmatrix} \hat{d}_{2m+1} \\ \hat{d}_{2m}^* \end{bmatrix} = \rho \begin{bmatrix} h_1^* \\ h_2^* \end{bmatrix} \left( \rho[\,h_1 \quad h_2\,]\begin{bmatrix} h_1^* \\ h_2^* \end{bmatrix} + 1 \right)^{-1} y_{2m+1}, \quad \text{Equation (48)}$$

or, $$\begin{bmatrix} \hat{d}_{2m+1} \\ \hat{d}_{2m}^* \end{bmatrix} = \frac{\rho}{\rho(|h_1|^2 + |h_2|^2) + 1} \begin{bmatrix} h_1^* \\ h_2^* \end{bmatrix} y_{2m+1}. \quad \text{Equation (49)}$$

Using Equations (47) and (49), the two estimates of $d_{2m}$ are added up as follows:

$$\hat{d}_{2m} = \frac{\rho}{\rho(|h_1|^2 + |h_2|^2) + 1}[h_1^* y_{2m} + h_2 y_{2m+1}^*]. \quad \text{Equation (50)}$$

The result is same to the result obtained in Equation (43). Doing the sum for the estimate of $d_{2m+1}$ will also result in the same as that from Equation (43). Thus, in the simple 2×1 Alamouti scheme, the two decoding techniques are identical. However, it may not be as in the 3×2 case in Table 1.

Figure 4:
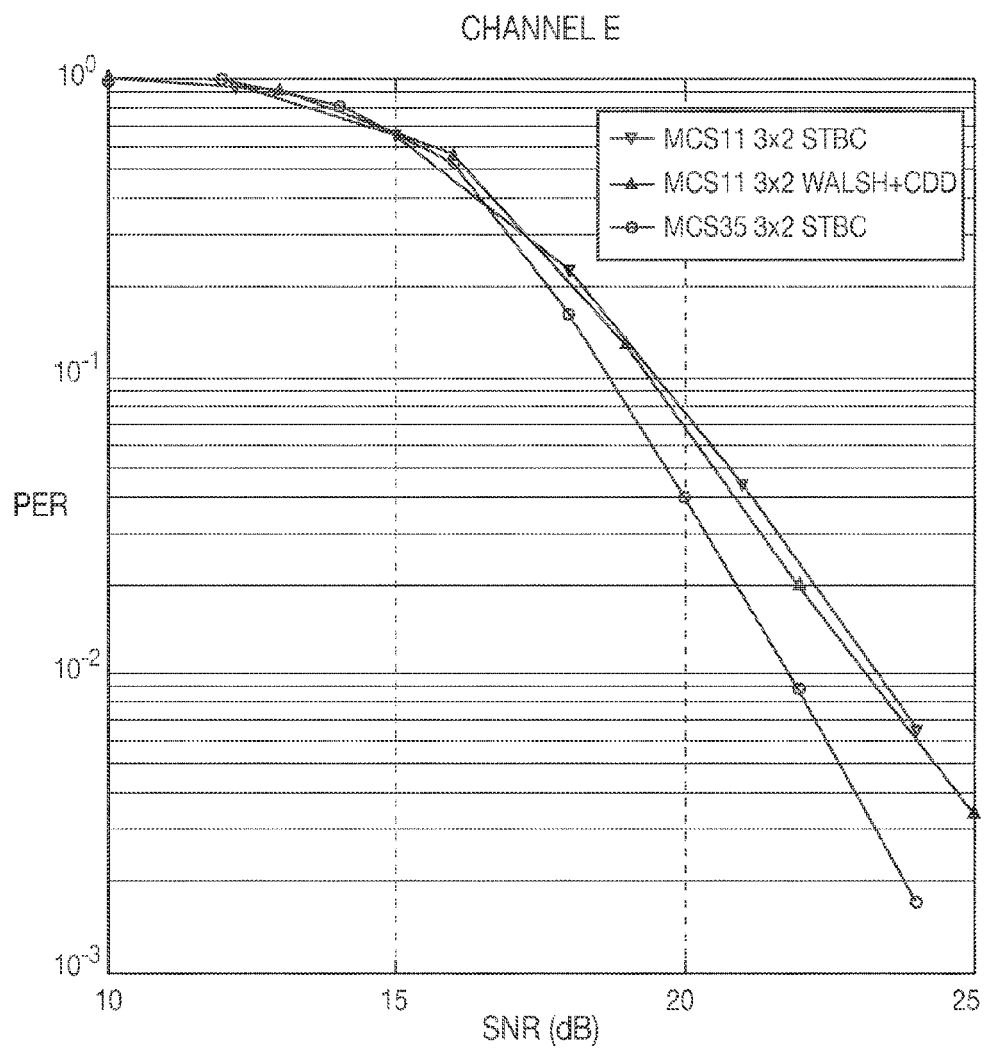
FIGS. 4 and 5 show simulation results for IEEE 802.11n, channels E and B using a 3×2 antenna configuration and a linear minimum mean square error (LMMSE) receiver.
Figure 5:
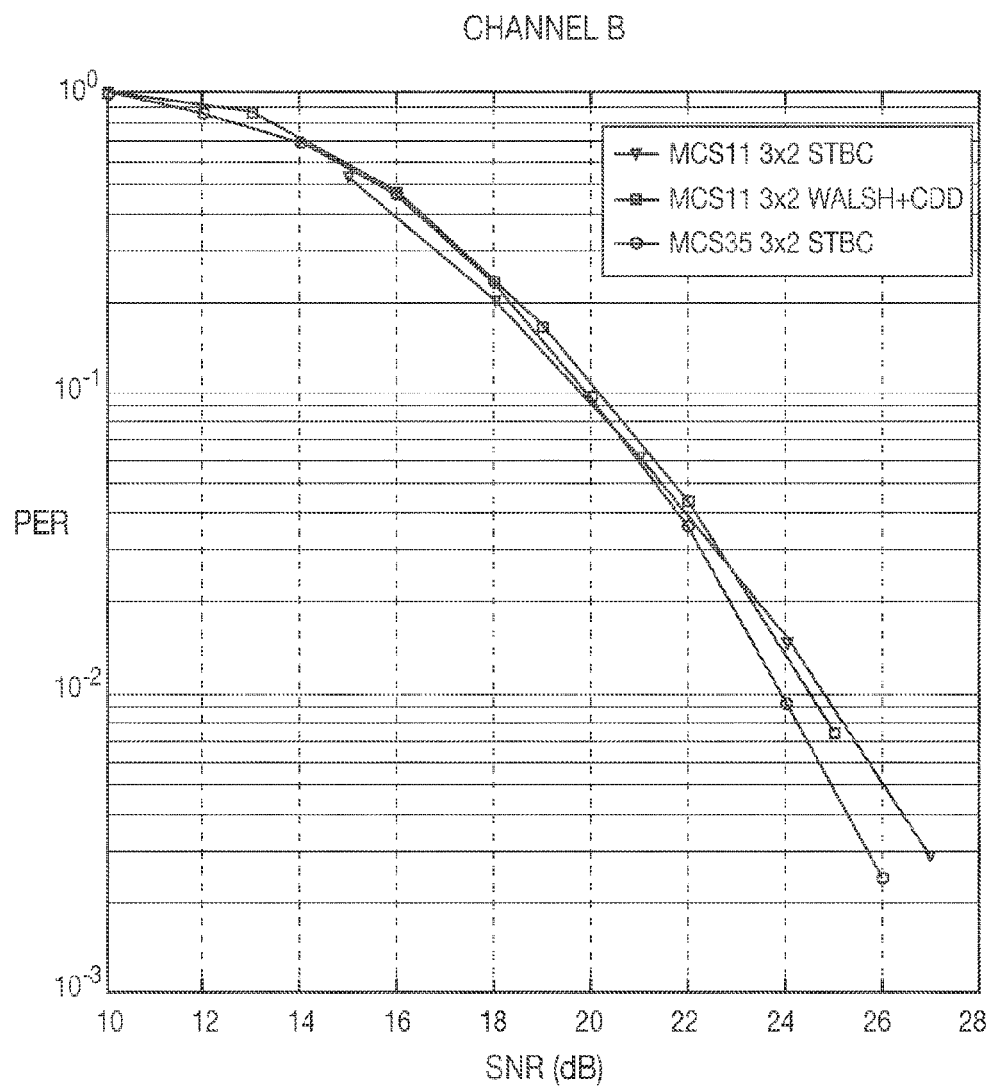

FIGS. 4 and 5 show simulation results for an IEEE 802.11n channels E and B using a 3×2 antenna configuration and a linear MMSE (LMMSE) receiver. The simulation results show that the case using an unequal modulation scheme of 64 QAM and QPSK has about 1.5 dB (0.8 dB) better in terms of packet error rate (PER) than the case using equal modulation scheme of 16 QAM and 18 QAM for channel E (channel B).

The transmitter and the receiver may be a wireless transmit/receive unit (WTRU) or a base station. The terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. The terminology "base station" includes but is not limited to a Node-B, a site controller, an access point (AP), or any other type of interfacing device capable of operating in a wireless environment.

Although the features and elements of the present invention are described in the preferred embodiments in particular combinations, each feature or element can be used alone without the other features and elements of the preferred embodiments or in various combinations with or without other features and elements of the present invention. The methods or flow charts provide in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media, such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for transmitting multiple data streams in an Institute of Electrical and Electronics Engineers (IEEE) 802.11 device, the method comprising:
    generating a first spatial stream and a second spatial stream;
    on a condition that the first spatial stream and the second spatial stream belong to a first station (STA):
        processing each of the first spatial stream and the second spatial stream to generate two or more space-time streams,
        mapping the space-time streams associated with the first STA to a plurality of data streams, and
        transmitting the plurality of data streams via a plurality of antennas to the first STA;
    on a condition that the first spatial stream belongs to a first STA and the second spatial stream belongs to a second STA:
        processing the first spatial stream to generate a first set of two or more space-time streams and the second spatial stream to generate a second set of two or more space-time streams,
        mapping the first set of space-time streams and the second set of space-time streams to a plurality of data streams, and
        transmitting the data streams via a plurality of antennas to the first STA and the second STA.

2. The method of claim 1, wherein the space-time streams are generated by using one or more of a space time block coding (STBC) processing or a cyclic delay diversity (CDD) processing.

3. The method of claim 1 comprising receiving a V matrix, wherein the processor is configured to receive a V matrix, wherein the V matrix is a unitary matrix derived from singular value decomposition (SVD) of an estimated channel matrix, and wherein the V matrix is associated with a STA and a sub carrier.

4. The method of claim 3, wherein the processing of the spatial streams or the mapping of the space-time streams is performed based on the received V matrix.

5. The method of claim 3 wherein the V matrix is a feedback matrix.

6. The method of claim 4, wherein the feedback matrix is associated with a channel state information (CSI).

7. An Institute of Electrical and Electronics Engineers (IEEE) 802.11 device comprising:
a processor and a memory having stored therein executable instructions for execution by the processor to at least:
generate a first spatial stream and a second spatial stream;
on a condition that the first spatial stream and the second spatial stream belong to a first station (STA):
process each of the first spatial stream and the second spatial stream to generate two or more space-time streams,
map the space-time streams associated with the first STA to a plurality of data streams, and
transmit the plurality of data streams via a plurality of antennas to the first STA;
on a condition that the first spatial stream belongs to a first STA and the second spatial stream belongs to a second STA:
process the first spatial stream to generate a first set of two or more space-time streams and the second spatial stream to generate a second set of two or more space-time streams,
map the first set of space-time streams and the second set of space-time streams to a plurality of data streams, and
transmit the data streams via a plurality of antennas to the first STA and the second STA.

8. The IEEE 802.11 device of claim 7, wherein the space-time streams are generated by using one or more of a space time block coding (STBC) processing or a cyclic delay diversity (CDD) processing.

9. The IEEE 802.11 device of claim 7, wherein the processor is configured to receive a V matrix, wherein the V matrix is a unitary matrix derived from singular value decomposition (SVD) of an estimated channel matrix, and wherein the V matrix is associated with a STA and a sub carrier.

10. The IEEE 802.11 device of claim 9, wherein the processing of the spatial streams or the mapping of the space-time streams is performed based on the received V matrix.

11. The IEEE 802.11 device of claim 9, wherein the V matrix is a feedback matrix.

12. The IEEE 802.11 device of claim 11, wherein the feedback matrix is associated with a channel state information (CSI).

* * * * *